United States Patent
Hsieh et al.

(10) Patent No.: US 12,153,760 B1
(45) Date of Patent: Nov. 26, 2024

(54) FORCE TOUCH JUDGMENT METHOD

(71) Applicant: Primax Electronics Ltd., Taipei (TW)

(72) Inventors: Chieh-Hung Hsieh, Taipei (TW);
Chao-Wei Lee, Taipei (TW);
Hsueh-Chao Chang, Taipei (TW);
Wei-Chiang Huang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 18/381,596

(22) Filed: Oct. 18, 2023

(30) Foreign Application Priority Data

Jul. 21, 2023 (TW) .................................. 112127349

(51) Int. Cl.
*G06F 3/041* (2006.01)
*G01L 1/00* (2006.01)
*G06F 3/01* (2006.01)
*G06F 3/0354* (2013.01)

(52) U.S. Cl.
CPC .............. *G06F 3/0418* (2013.01); *G01L 1/00* (2013.01); *G06F 3/016* (2013.01); *G06F 3/03547* (2013.01); *G06F 3/0414* (2013.01); *G06F 2203/04105* (2013.01)

(58) Field of Classification Search
None
See application file for complete search history.

(56) References Cited

U.S. PATENT DOCUMENTS

| | | | | |
|---|---|---|---|---|
| 2012/0032907 | A1* | 2/2012 | Koizumi | G06F 3/0414 |
| | | | | 345/173 |
| 2013/0234988 | A1* | 9/2013 | Ando | G06F 3/0488 |
| | | | | 345/174 |
| 2014/0267134 | A1* | 9/2014 | Bulea | G06F 3/04166 |
| | | | | 345/174 |
| 2017/0242506 | A1* | 8/2017 | Patel | G06F 3/0446 |
| 2017/0249049 | A1* | 8/2017 | Wang | G06F 3/0412 |
| 2017/0277350 | A1* | 9/2017 | Wang | G06F 3/0418 |
| 2018/0018055 | A1* | 1/2018 | Li | H01H 1/029 |
| 2021/0200403 | A1* | 7/2021 | Nam | G06F 3/0445 |
| 2021/0294479 | A1* | 9/2021 | Moscovich | G06F 3/045 |
| 2022/0011892 | A1* | 1/2022 | Rosenberg | G06F 3/0447 |
| 2022/0365603 | A1* | 11/2022 | Chaput | H04M 1/236 |
| 2023/0012281 | A1* | 1/2023 | Yang | G06F 3/0418 |

* cited by examiner

*Primary Examiner* — Patrick N Edouard
*Assistant Examiner* — Peijie Shen
(74) *Attorney, Agent, or Firm* — KIRTON McCONKIE; Evan R. Witt (57) ABSTRACT

A force touch judgement method is applied to a force touch pad with two force sensors. Firstly, a force touch operation corresponding to a real force value is performed on a force touch position. Then, a first sensing signal value and a second sensing signal value corresponding to the force touch operation are respectively generated by the two force sensors. Then, the first sensing signal value and the second sensing signal value are added as a total sensing signal value. A calibration force value corresponding to the force touch position is obtained. A first calibration signal value and a second calibration signal value corresponding to the force touch position are added as a total calibration signal value. A ratio of the total sensing signal value to the total calibration signal value is equal to a ratio of the real force value to the calibration force value.

10 Claims, 5 Drawing Sheets

FORCE TOUCH JUDGMENT METHOD

FIELD OF THE INVENTION

The present invention relates to a force touch judgement method, and more particularly to a force touch judgement method applied to a force touch pad with at least two force sensors and capable of accurately realizing the position and the force value of the user's force touch operation.

BACKGROUND OF THE INVENTION

Nowadays, notebook computers become essential tools for modern people in their daily lives. The user can operate an external mouse device to control a notebook computer. In addition, the notebook computer is usually equipped with a touch pad. The user can move a cursor or perform a clicking control operation through the touch pad.

A general touch pad allows for the horizontal movement and the sliding control. When compared with the touch pad, a force touch pad or a pressure touch pad further allows for a vertical touch operation. That is, when the surface of the force touch pad or the pressure touch pad is pressed down, heavily pressed or long pressed by the user's finger, one of plural operating functions is correspondingly activated. When compared with the double click gesture or the multi-touch gesture of operating the conventional touch pad, the control experience of using the force touch pad or the pressure touch pad by the user is more natural and intuitive.

As known, the key structure of a general keyboard is equipped with a mechanical structure design for providing a pressing feel to the user. In contrast, the force touch pad is equipped with plural force sensors. After the force touch condition of the user's finger is sensed by the plural force sensors, a vibration motor generates feedback to the user. Since the feedback simulates the action of the mechanical structure, the user can realize that the force touch operation has been effectively performed on the force touch pad according to the feedback.

In order to effectively sense the user's force touch condition, a certain number of force sensors need to be arranged and evenly distributed in the touch area of the touch pad. If the range of the touch area is larger, it is necessary to install more force sensors to make up for the lack of linearity between the force source and the force sensors. Since the number of the force sensors increases, the fabricating cost of the force touch pad increases. Moreover, when the force touch pad is operated by the user, the force touch pad may be unwillingly or erroneously touched. For example, if the user intends to operate the force touch pad with the right hand but the touch area is accidentally touched by the left hand, the misjudgment possibly occurs. Consequently, the operating result of the touch control function is adversely affected.

In order to accurately operate the touch control function of the force touch pad, it is important to effectively calculate the force value of the user's force touch operation for subsequent processing and judging operations.

SUMMARY OF THE INVENTION

An object of the present invention provides a force touch judgement method. The force touch judgement method is applied to a force touch pad with at least two force sensors. The force touch judgement method is capable of sensing and judging the corresponding force touch operation and accurately realize the position and the force value of the force touch operation. Consequently, the subsequent application or the preset function can be accurately executed according to the requirements of the user. In addition, the inconvenience of erroneously touching the force touch pad will be minimized.

In accordance with an aspect of the present invention, a force touch judgement method for a force touch pad is provided. The force touch pad includes a processing module, a touch member, a first force sensor and a second force sensor. The force touch judgement method includes the following steps. Firstly, a first force touch operation corresponding to a first real force value is performed on the touch member, and thus the touch member generates a first force touch position corresponding to the first force touch operation. Then, a first sensing signal value corresponding to the first force touch operation is generated by the first force sensor, and a second sensing signal value corresponding to the first force touch operation is generated by the second force sensor. Then, the first sensing signal value and the second sensing signal value are added by the processing module, and thus a total sensing signal value is generated. Then, a first calibration force value corresponding to the first force touch position is obtained by the processing module. Then, a first calibration signal value of the first force sensor corresponding to the first force touch position and a second calibration signal value of the second force sensor corresponding to the first force touch position are obtained by the processing module. Then, the first calibration signal value and the second calibration signal value are added by the processing module, and thus a total calibration signal value is generated. Afterwards, the first real force value is obtained by the processing module according to the total sensing signal value, the total calibration signal value and the first calibration force value. A ratio of the total sensing signal value to the total calibration signal value is equal to a ratio of the first real force value to the first calibration force value.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a force touch judgement method. A force touch judgement method according to a first embodiment of the present invention will be described as follows.

Figure 1:
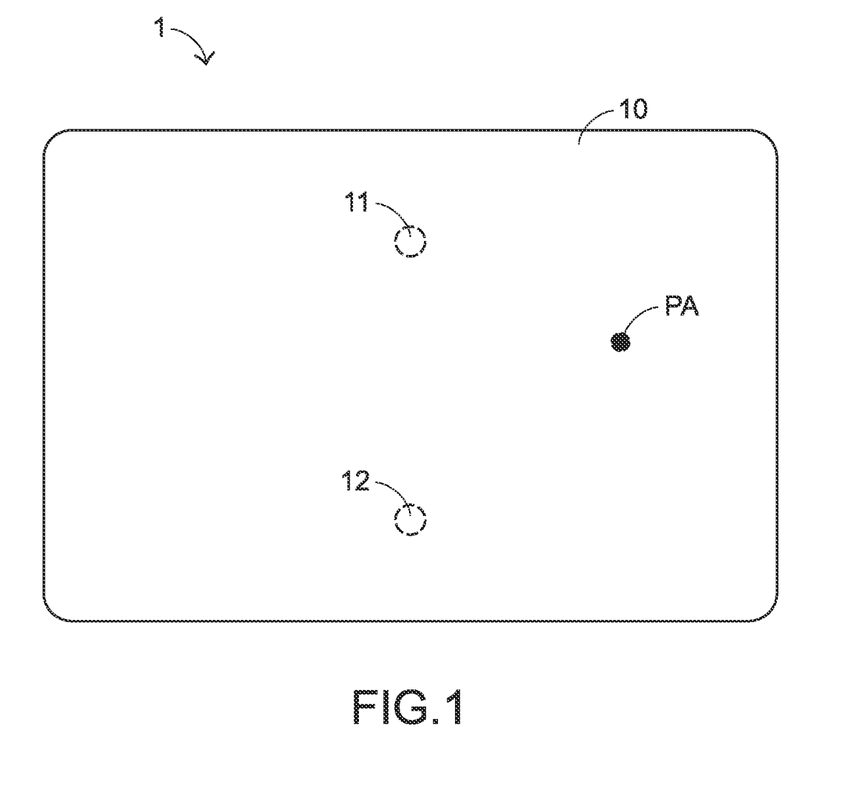
FIG. 1 is a force touch pad using a force touch judgement method according to a first embodiment of the present invention.

FIG. 1 is a force touch pad using a force touch judgement method according to a first embodiment of the present invention. As shown in FIG. 1, the force touch pad 1 comprises a touch member 10, a first force sensor 11 and a second force sensor 12. The first force sensor 11 and the second force sensor 12 are located under the touch member 10. In addition, the first force sensor 11 and the second force sensor 12 are evenly distributed in the area of the touch member 10.

The force touch pad 1 further comprises a processing module (not shown) and a vibration module (not shown). The processing module is in communication with the first force sensor 11 and the second force sensor 12. The processing module is responsible for a processing and judging procedure of the force touch judgement method. The vibration module executes a vibration function according to the result of the processing and judging procedure of the processing module.

In an embodiment, the force touch pad 1 can be installed on a computing device (not shown). For example, the computing device is a notebook computer, and the force touch pad 1 is a user interface or a control panel of the notebook computer. Through the user interface or the control panel, the cursor corresponding to the operating system can be moved horizontally or slid by the user, or the vertical force touch operation can be performed. It is noted that the applications of the force touch pad 1 are not restricted. For example, in some other embodiments, the force touch pad 1 may be applied to any other appropriate electronic device such as a smart phone, a tablet computer or a wearable device.

In an embodiment, the computing device is a known electronic device, and the force touch judgement method is executed by a firmware component that is installed in the computing device. Alternatively, the force touch judgement method is written as an operation program code and stored in a flash memory. The firmware component or the operation program code is provided to the processing module and accessed and executed by the processing module. Consequently, a force touch judgement function can be implemented.

In accordance with a main object of the force touch judgement method of the present invention, a limited number of force sensors are used to judge the strength of the user's force touch operation, especially the finger's force touch operation or the palm's force touch operation. In the first embodiment, two force sensors 11 and 12 and a force touch operation corresponding to a force touch position PA are presented for illustration. After the position and the force strength corresponding to the user's force touch operation are calculated, the computing device can effectively confirm the intention of the user's operation and then complete the designated operation. The detailed flowchart of the force touch judgement method will be described in more details as follows.

Figure 2:
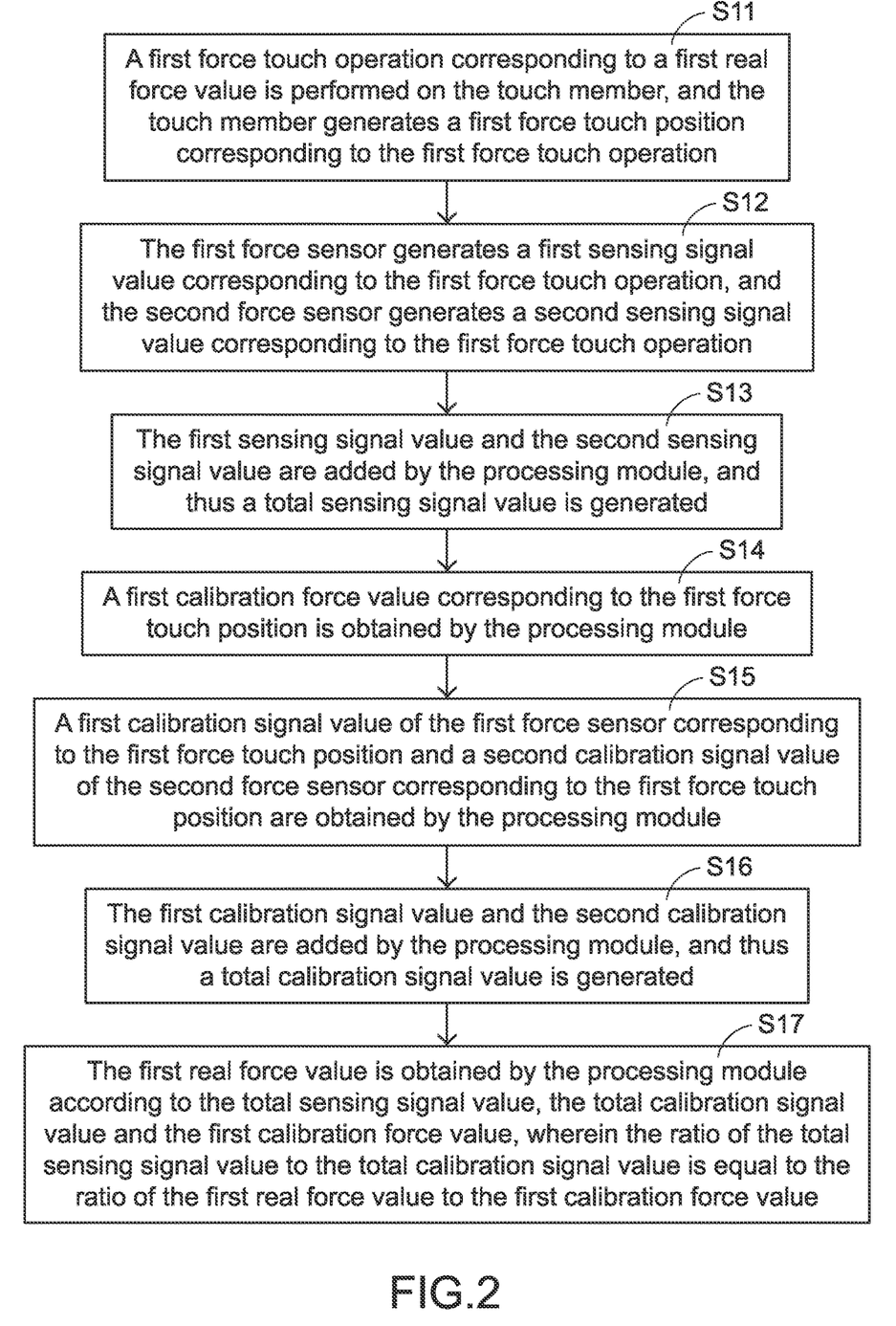
FIG. 2 illustrates a flowchart of the force touch judgement method according to the first embodiment of the present invention.

FIG. 2 illustrates a flowchart of the force touch judgement method according to the first embodiment of the present invention.

Firstly, in a step S11, a first force touch operation corresponding to a first real force value is performed on the touch member 10, and the touch member 10 generates a first force touch position PA corresponding to the first force touch operation.

Then, in a step S12, the first force sensor 11 generates a first sensing signal value corresponding to the first force touch operation, and the second force sensor 12 generates a second sensing signal value corresponding to the first force touch operation.

Then, in a step S13, the first sensing signal value and the second sensing signal value are added by the processing module, and thus a total sensing signal value is generated.

Then, in a step S14, a first calibration force value corresponding to the first force touch position PA is obtained by the processing module.

Then, in a step S15, a first calibration signal value of the first force sensor 11 corresponding to the first force touch position PA and a second calibration signal value of the second force sensor 12 corresponding to the first force touch position PA are obtained by the processing module.

Then, in a step S16, the first calibration signal value and the second calibration signal value are added by the processing module, and thus a total calibration signal value is generated.

Afterwards, in a step S17, the first real force value is obtained by the processing module according to the total sensing signal value, the total calibration signal value and the first calibration force value, wherein the ratio of the total sensing signal value to the total calibration signal value is equal to the ratio of the first real force value to the first calibration force value.

In the step S11, the touch member 10 is a sensing component of the force touch pad 1 for sensing the touch control operation (e.g., the horizontal motion or the sliding motion) of the user's finger. For example, in case that a capacitive touch control technology is adopted, the touch member 10 comprises a touch sensing module (not shown). When the user's finger touches the panel, the capacitance of the electrostatic field on the panel is subjected to a change. According to the position corresponding to the changed capacitance, the touch sensing module realizes the movement of the user's finger. In the step S11, when the first force touch operation is performed on the touch member 10, the first force touch position PA corresponding to the first force touch operation is formed on a two-dimensional plane by the touch sensing module. In other words, the first force touch position PA may be regarded as an information that is sensed and acquired by an existing component.

In the step S12, the first force sensor 11 and the second force sensor 12 are independently arranged. In addition, the first force sensor 11 and the second force sensor 12 individually perform the sensing operations to respectively generate the corresponding sensing signal values. That is, the first force sensor 11 generates the first sensing signal value, and the second force sensor 12 generates the second sensing signal value. In addition, the first force sensor 11 and the second force sensor 12 are evenly distributed in the area of the touch member 10. Of course, the user's finger may touch and press any position of the touch member 10, for example the first force touch position PA. In case that the force touch position is closer to a specified force sensor, the sensing signal value generated by the specified force sensor is larger. Whereas, in case that the force touch position is farther away from the specified force sensor, the sensing signal value generated by the specified force sensor is smaller. The distance between the force touch position and the specified force sensor is linearly related to the sensing signal value generated by the specified force sensor. Moreover, in response to the same force touch operation, the first sensing signal value generated by the first force sensor 11 and the second sensing signal value generated by the second force sensor 12 are possibly different.

In the step S13, the first sensing signal value and the second sensing signal value are added directly. For example, assuming that the first sensing signal value and the second sensing signal value are respectively 2 million units and 4 million units, the total sensing signal value is 6 million units.

For implementing the steps S14 and S15, the processing module further comprises a memory unit (not shown). Moreover, a look-up table about the relationships between various coordinates of the touch member 10 and a set of calibration signal values corresponding to the first force sensor 11 and the second force sensor 12 and the relationships between various coordinates of the touch member 10 and the corresponding calibration force values are stored in the memory unit.

Preferably, before the force touch pad 1 with the first force sensor 11 and the second force sensor 12 leaves the factory, a calibration process is performed. For example, the force touch operation is performed on all possible force touch points of the touch member 10, and the sensing results about the first force sensor 11 and the second force sensor 12 are acquired. The associated sensing results are recoded as the look-up table. The content of the look-up table is the information recorded in order of coordinates (e.g., (x, y)). Each coordinate is correlated with a calibration force value. Moreover, each coordinate is correlated with a calibration signal value corresponding to the first force sensor 11 and a calibration signal value corresponding to the second force sensor 12.

Since the force touch pad 1 comprises two force sensors 11 and 12, each coordinate in the look-up table is correlated with two calibration signal values. Even if the real force value performed on the same coordinate of the touch member 10 is changed, the two calibration signal values corresponding to the same coordinate are fixed. Similarly, even if the real force value performed on the same coordinate of the touch member 10 is changed, the calibration force value is fixed.

In the steps S14 and S15, the processing module searches the first calibration force value from the look-up table according to the coordinate of the first force touch position PA, and the processing module searches the first calibration signal value and the second calibration signal value from the look-up table according to the coordinate of the first force touch position PA.

In the step S16, the first calibration signal value and the second calibration signal value are added directly. For example, assuming that the first calibration signal value and the second calibration signal value are respectively 1 million units and 2 million units, the total calibration signal value is 3 million units.

As mentioned above, the total sensing signal value is obtained through the sensing operation, and the total calibration signal value and the first calibration force value are obtained from the look-up table. In other words, only the first real force value is unknown and needs to be requested. In the step S17, the ratio of the total sensing signal value to the total calibration signal value is equal to the ratio of the first real force value to the first calibration force value. Consequently, the first real force value can be obtained according to the above ratio relationship.

For example, the total sensing signal value is $\overline{S}$, the total calibration signal value is $\overline{S_C}$, the first calibration force value is Fc, and the first real force value is F. The relationship between these values may be expressed by the following mathematic equation:

$$\frac{\overline{S}}{\overline{S_C}} = \frac{F}{F_C} \qquad \text{Equation (1-1)}$$

Alternatively, the relationship between these values may be expressed by the following mathematic equation:

$$\overline{S} = \overline{S_C} \cdot \frac{F}{F_C} \qquad \text{Equation (1-2)}$$

In addition, a force ratio R may be expressed by the following mathematic equation:

$$R = \frac{F}{F_C} \qquad \text{Equation (1-3)}$$

The equation (1-2) may be rewritten as:

$$\overline{S} = \overline{S_C} \cdot R \qquad \text{Equation(1-4)}$$

For example, in the equations (1-1), (1-2), (1-3) and (1-4), the first calibration force value Fc is 200 g, the total sensing signal value $\overline{S}$ is 6 million units, and the total calibration signal value $\overline{S_C}$ is 3 million units. In other words, the force ratio R is 2. Consequently, the calculated first real force value F is 400 g.

After the first real force value F is calculated, the computing device using the force touch judgement method recognizes the force value corresponding to the first force touch operation. Consequently, the subsequent processing operation and application can be implemented. Firstly, the processing module judges the first real force value F. If the first real force value F is higher than a force touch threshold value, the processing module issues a feedback instruction to the vibration module. In response to the feedback instruction, the vibration module results in the vibration.

By means of this application, the computing device can realize whether the force touch pad is subjected to the effective force touch operation or accidentally touched. In addition, the force touch threshold value is served as a judgement standard. Since the vibration module (e.g., the vibration motor) generates the vibration feedback to the user, the user can realize that the effective force touch operation has been completed. In other words, even if the force touch pad is equipped with two force sensors, the above efficacy can be achieved and the possibility of erroneously touching the force touch pad will be minimized.

In another embodiment, an application program is installed in the computing device using the force touch judgement method. If the processing module judges that the first real force value F is higher than the force touch threshold value, the processing module issues an operation instruction to the application program. According to the operation instruction, the application program executes a preset function. For example, the application program is a known application program for a general force touch pad, or the application program is designated by the user. The preset function is a known function corresponding to the application program, or the preset function is designated by the user. The type of the application program and the example of the preset function may be varied according to the practical requirements.

A force touch judgement method according to a second embodiment of the present invention will be described as follows.

Figure 3:
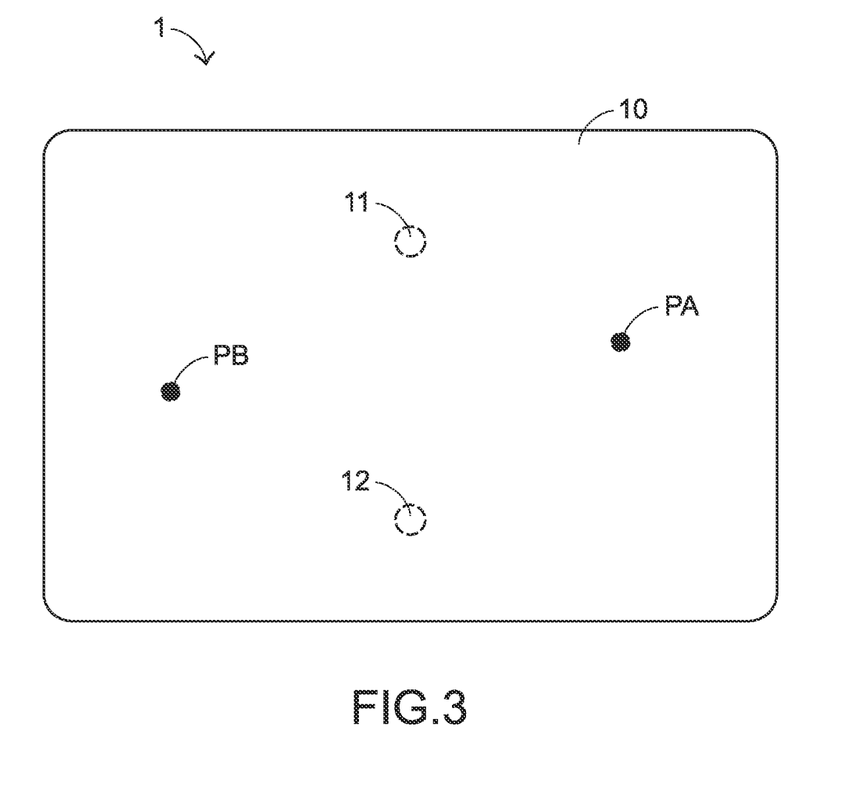
FIG. 3 is a force touch pad using a force touch judgement method according to a second embodiment of the present invention.

FIG. 3 is a force touch pad using a force touch judgement method according to a second embodiment of the present invention. As shown in FIG. 3, the force touch pad 1 also comprises the touch member 10, the first force sensor 11 and the second force sensor 12. In comparison with the first embodiment of FIG. 1, the touch member 10 of the second embodiment generates two force touch positions PA and PB corresponding to two force touch operations. Due to the two force touch operations, plural force touch positions and plural force values will be distinguished and calculated. Consequently, the computing device can effectively confirm the intention of the user's operation and then complete the designated operation. The detailed flowchart of the force touch judgement method will be described in more details as follows.

Figure 4A:
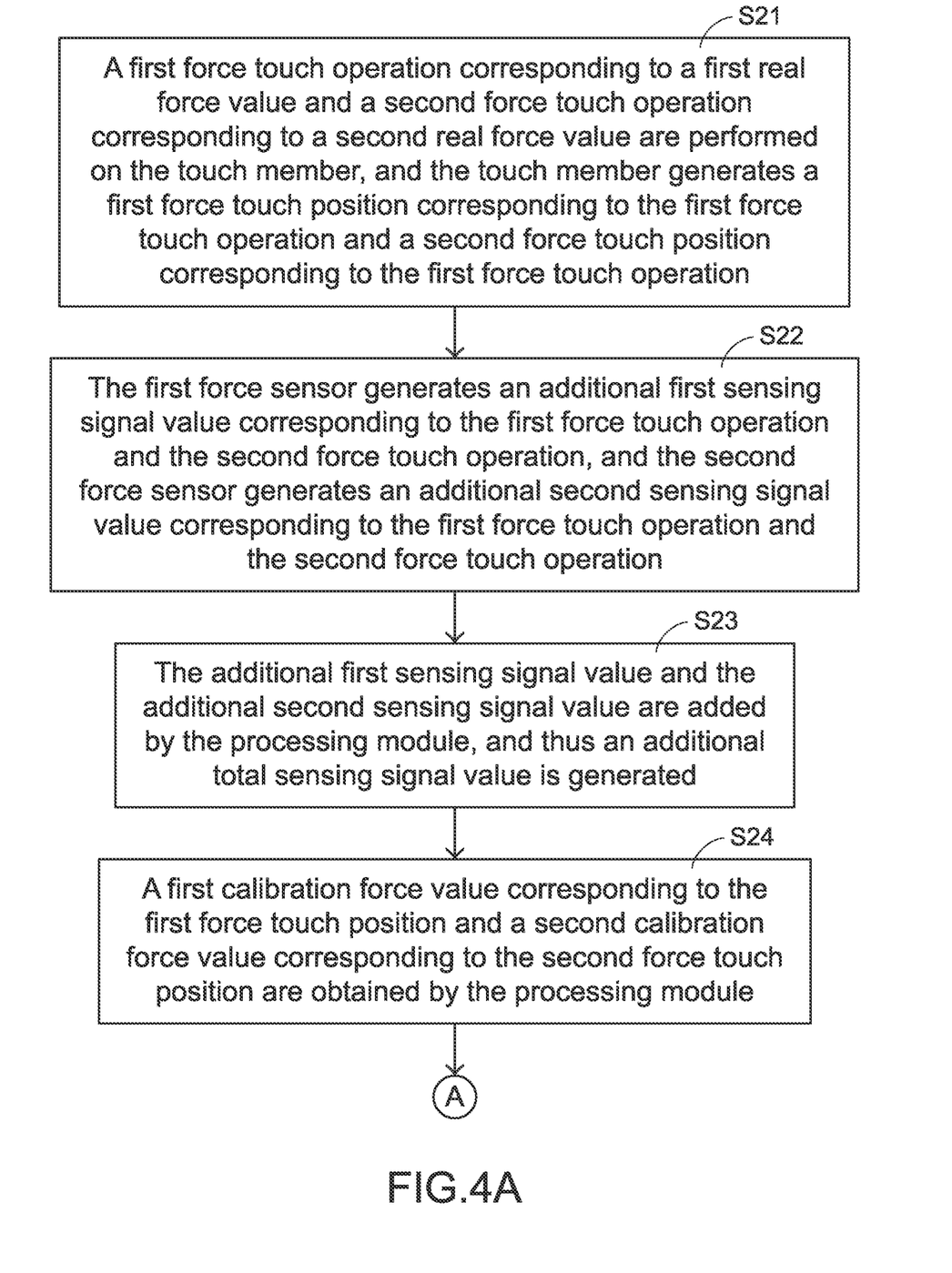
FIGS. 4A and 4B illustrate a flowchart of the force touch judgement method according to the second embodiment of the present invention.
Figure 4B:
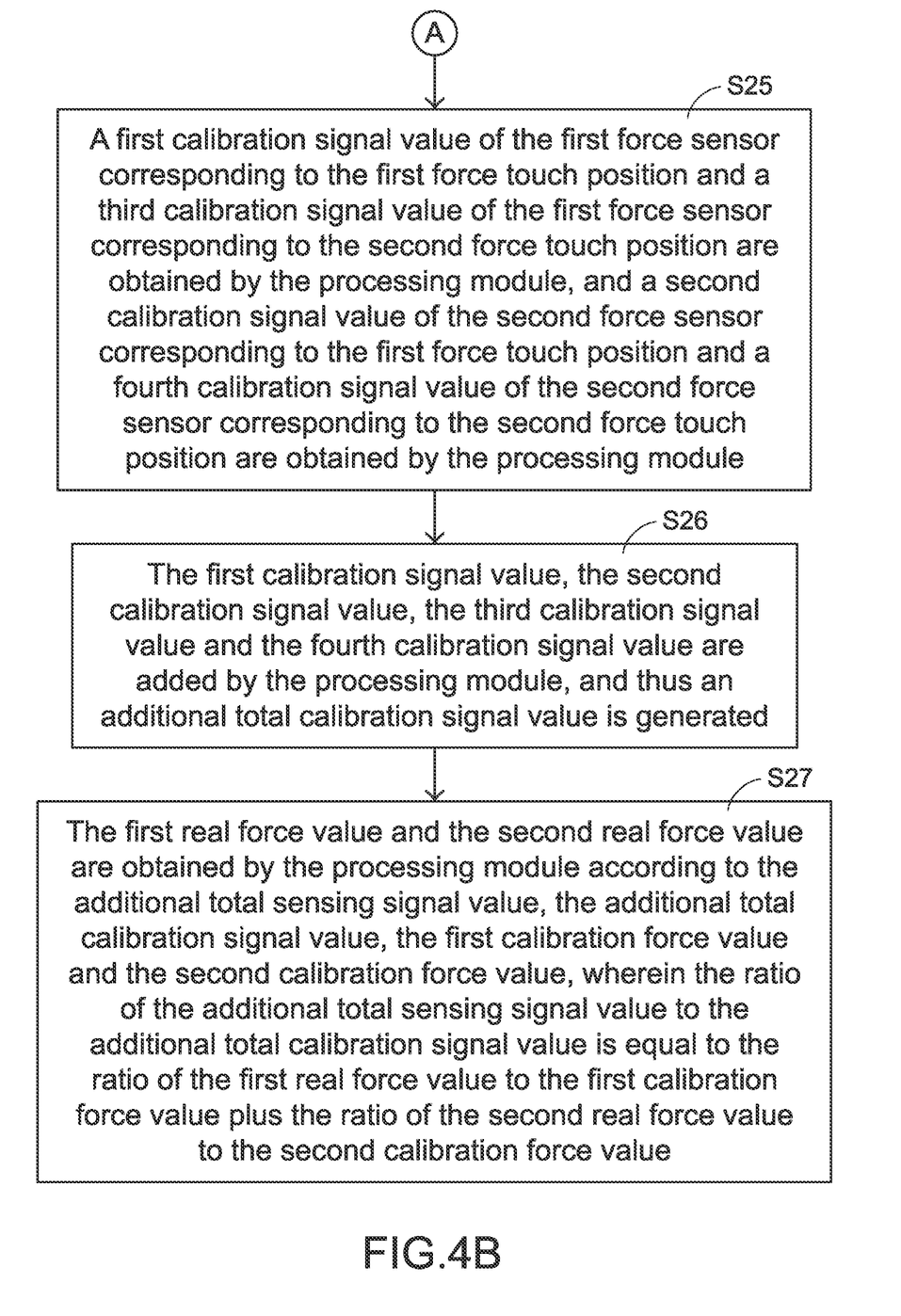

FIGS. 4A and 4B illustrate a flowchart of the force touch judgement method according to the second embodiment of the present invention.

Firstly, in a step S21, a first force touch operation corresponding to a first real force value and a second force touch operation corresponding to a second real force value are performed on the touch member 10, and the touch member 10 generates a first force touch position PA corresponding to the first force touch operation and a second force touch position PB corresponding to the second force touch operation.

Then, in a step S22, the first force sensor 11 generates an additional first sensing signal value corresponding to the first force touch operation and the second force touch operation, and the second force sensor 12 generates an additional second sensing signal value corresponding to the first force touch operation and the second force touch operation.

Then, in a step S23, the additional first sensing signal value and the additional second sensing signal value are added by the processing module, and thus an additional total sensing signal value is generated.

Then, in a step S24, a first calibration force value corresponding to the first force touch position PA and a second calibration force value corresponding to the second force touch position PB are obtained by the processing module.

Then, in a step S25, a first calibration signal value of the first force sensor 11 corresponding to the first force touch position PA and a third calibration signal value of the first force sensor 11 corresponding to the second force touch position PB are obtained by the processing module, and a second calibration signal value of the second force sensor 12 corresponding to the first force touch position PA and a fourth calibration signal value of the second force sensor 12 corresponding to the second force touch position PB are obtained by the processing module.

Then, in a step S26, the first calibration signal value, the second calibration signal value, the third calibration signal value and the fourth calibration signal value are added by the processing module, and thus an additional total calibration signal value is generated.

Afterwards, in a step S27, the first real force value and the second real force value are obtained by the processing module according to the additional total sensing signal value, the additional total calibration signal value, the first calibration force value and the second calibration force value, wherein the ratio of the additional total sensing signal value to the additional total calibration signal value is equal to the ratio of the first real force value to the first calibration force value plus the ratio of the second real force value to the second calibration force value.

The step S21 of the second embodiment is similar to the step S11 of the first embodiment. In the step S21, two force touch positions corresponding to the two force touch operations are formed on the two-dimensional plane by the touch sensing module. Since the two force touch operations are performed simultaneously, the two force touch positions PA and PB are formed.

In the step S22, the first force sensor 11 and the second force sensor 12 individually perform the sensing operations. Since the two force touch operations are performed simultaneously, the additional first sensing signal value generated by the first force sensor 11 is the sensing result corresponding to the first force touch operation and the second force touch operation. Similarly, the additional second sensing signal value generated by the second force sensor 12 is the sensing result corresponding to the first force touch operation and the second force touch operation. The object of this embodiment is to distinguish and calculate the real force values corresponding to the two force touch operations. That is, it is not necessary to calculate the sensing result of a specified force sensor corresponding to a specified force touch operation.

In the step S23, the additional first sensing signal value and the additional second sensing signal value are added as a matrix. For example, the additional total sensing signal value is expressed as a 2×1 matrix.

The steps S24 and S25 of this embodiment are similar to the steps S14 and S15 of the first embodiment. In the calibration process, the associated calibration force values and the associated calibration signal values are firstly recorded into the look-up table. As mentioned above, since the two force touch operations are performed simultaneously, the two force touch positions PA and PB are formed. In case that one force touch position is correlated with one coordinate, the two force touch operations are related to two calibration force values. In this embodiment, the force touch pad 1 comprises two force sensors 11 and 12. In case that one force touch position is correlated with one coordinate, the two force touch operations are related to four calibration signal values.

In the steps S24 and S25, the processing module searches the first calibration force value and the second calibration force value from the look-up table according to the coordinate of the first force touch position PA and the coordinate of the second force touch position PB, and the processing module searches the first calibration signal value, the second calibration signal value, the third calibration signal value and the fourth calibration signal value from the look-up table according to the coordinate of the first force touch position PA and the coordinate of the second force touch position PB.

In the step S26, the first calibration signal value, the second calibration signal value, the third calibration signal value and the fourth calibration signal value are added as a matrix. For example, the additional total calibration signal value is expressed as a 2×2 matrix.

As mentioned above, the additional total sensing signal value is obtained through the sensing operation, and the additional total calibration signal value, the first calibration force value and the second calibration force value are obtained from the look-up table. In other words, only the first real force value and the second real force value are unknown and needs to be requested. In the step S27, the ratio of the additional total sensing signal value to the additional total calibration signal value is equal to the ratio of the first real force value to the first calibration force value plus the ratio of the second real force value to the second calibration force value. Consequently, the first real force value and the second real force value can be obtained according to the above ratio relationship.

For example, the additional total sensing signal value is $\overline{S'}$, the additional total calibration signal value is $\overline{S'_C}$, the first calibration force value is $F_{CA}$, the second calibration force value is $F_{CB}$, the first real force value is $F_A$ and the second real force value is $F_B$. The relationship between these values may be expressed by the following mathematic equation:

$$\frac{\overline{S'}}{\overline{S'_C}} = R \qquad \text{Equation (2-1)}$$

Alternatively, the relationship between these values may be expressed by the following mathematic equation:

$$\overline{S'} = \overline{S'_C} \cdot R \qquad \text{Equation (2-2)}$$

$$R_A = \frac{F_A}{F_{CA}}, R_B = \frac{F_B}{F_{CB}} \qquad \text{Equation (2-3)}$$

In the above mathematic equation, R is equal to $R_A$ plus $R_B$, wherein $R_A$ is the ratio of the first real force value $F_A$ to the first calibration force value $F_{CA}$, and $R_B$ is the ratio of the second real force value $F_B$ to the second calibration force value $F_{CB}$. In the equation (2-1), R is also expressed as a matrix, e.g., a 2×1 matrix.

The additional first sensing signal value is $S_1$, the additional second sensing signal value is $S_2$, and the additional total sensing signal value $\overline{S'}$ is expressed as a 2×1 matrix. The first calibration signal value is $S_{CA1}$, the second calibration signal value is $S_{CA2}$, the third calibration signal value is $S_{CB1}$, and the fourth calibration signal value is $S_{CB2}$. The additional total calibration signal value $S_C$ is expressed as a 2×2 matrix. Consequently, the equation (2-2) may be rewritten as:

$$\begin{bmatrix} S_1 \\ S_2 \end{bmatrix} = \begin{bmatrix} S_{CA1} & S_{CB1} \\ S_{CA2} & S_{CB2} \end{bmatrix} \cdot \begin{bmatrix} R_A \\ R_B \end{bmatrix} \qquad \text{Equation (2-4)}$$

As mentioned above, in the equation (2-4), only $R_A$ and $R_B$ are unknown. That is, only the first real force value $F_A$ and the second real force value $F_B$ are unknown. That is, in the eight values, two values are unknown, and the other six values are known. After further expansion into simultaneous equations, there is enough information to solve the two unknown values. That is, the first real force value $F_A$ and the second real force value $F_B$ can be calculated.

After the first real force value and the second real force value are calculated, the computing device using the force touch judgement method recognizes the force values corresponding to the first force touch operation and the second force touch operation. Consequently, the subsequent processing operation and application can be implemented. Like the first embodiment, the computing device can realize whether the force touch pad is subjected to the effective force touch operation or accidentally touched. If the force touch operation is effective, the feedback instruction is provided to the user. Alternatively, in addition to the function executed by the associated application program, other applications can be implemented.

As mentioned above, two force touch operations are performed simultaneously. In some situations, one of the two force touch operations is erroneously performed by the user. Consequently, a judging method is also provided. For example, if both of the first real force value and the second real force value are higher than a force touch threshold value and the second real force value is lower than the first real force value, the processing module ignores the second real force value.

In other words, although the real force values corresponding to the two force touch operations are higher than the force touch threshold value, the force touch operation corresponding to the lower real force value is discarded through the comparison between the two real force values. In other words, only the function corresponding to one of the two force touch operations is enabled to issue the feedback instruction. As a consequence, the erroneous touch event can be discarded.

In the calibration process of the above two embodiments, the force touch operation is performed on all possible force touch points of the touch member in a coordinate system, and the associated sensing results are recoded as the look-up table. In the real operating situation, the force touch operation is possibly performed on a force touch point where no data corresponding to the coordinate is recorded. Under this circumstance, the associated values are searched from the look-up table according to the closer coordinate of the force touch position, or the associated values are searched from the look-up table according to the coordinate obtained through the interpolation or average of the nearby coordinates.

Furthermore, the force touch operation is possibly related to a specified force touch area. For example, the first force touch position corresponding to the first force touch operation has a first sensing range, and the second force touch position corresponding to the second force touch operation has a second sensing range. For realizing which force touch operation is the intended operation of the user, the following judging method is also provided. For example, if the second sensing range is larger than the first sensing range, the processing module ignores the second real force value.

In other words, although the two force touch operations are possibly the normal force touch operations, the force touch operation corresponding to the larger sensing range is discarded through the comparison between the two force touch areas. For example, the force touch operation performed by the user's finger is retained, but the erroneous force touch operation performed by the user's palm or wrist is discarded. In other words, only the function corresponding to one of the two force touch operations is enabled to issue the feedback instruction. As a consequence, the erroneous touch event can be discarded.

It is noted that numerous modifications and alterations may be made while retaining the teachings of the invention. For example, in another embodiment, the force touch pad comprises three force sensors to sense and judge three force touch operations. Alternatively, the force touch pad is equipped with more force sensors for achieving more precise force touch sensing and judging results. However, in any variant example, the equations (1-1) to (1-4) and the equations (2-1) to (2-4) are feasible. It is noted that the number of the force touch operations represents the number of the unknown values. For acquiring sufficient information to calculate the unknown real force value, it is preferred that the number of the installed force sensors is correlated to the maximum number of the real force values to be calculated.

Furthermore, if the number of the force sensors is increased, the matrix of the total sensing signal value on the left side of the equal sign in the equation (2-4) will be expanded downwardly. Similarly, if the number of the force touch operations is increased, the matrix of the ratio sum on the rightmost side of the equal sign in the equation (2-4) will also be expanded downwardly. However, the contents of the matrix of the total calibration signal value can be obtained by searching the look-up table. For example, in case that the force touch pad comprises three force sensors corresponding to two force touch operations, the total calibration signal value can be expressed as a 3×2 matrix. As long as the number of the force sensor is not smaller than the number of the force touch operations, there is sufficient information for the processing module to calculate the ratio relationship. In other words, the real force values corresponding to all force touch operations can be obtained.

From the above descriptions, the present invention provides a force touch judgement method. The force touch judgement method is applied to a force touch pad with at least two force sensors. The force touch judgement method is capable of sensing and judging the corresponding force touch operation and accurately realize the position and the force value of the force touch operation. Consequently, the subsequent application or the preset function can be accurately executed according to the requirements of the user. In addition, the inconvenience of erroneously touching the force touch pad will be minimized.

In other words, the force touch judgement method is capable of effectively overcoming the drawbacks of the conventional technologies and achieving the purposes of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A force touch judgement method for a force touch pad, the force touch pad comprising a processing module, a touch member, a first force sensor with linear response and a second force sensor with linear response, the first force sensor and the second force sensor being located under the touch member and at different positions, the force touch judgement method comprising steps of:
    performing a calibration process on the force touch pad, comprising:
        respectively performing force touch operations with a calibration force value on plural coordinates of the touch member to generate first calibration signal values by the first force sensor and second calibration signal values by the second force sensor, wherein each of the plural coordinates corresponds to the calibration force value, one of the first calibration signal values and one of the second calibration signal values;
    performing a first force touch operation corresponding to a first real force value on the touch member, so that the touch member generates a first force touch position corresponding to the first force touch operation;
    generating a first sensing signal value corresponding to the first force touch operation by the first force sensor, and generating a second sensing signal value corresponding to the first force touch operation by the second force sensor;
    adding the first sensing signal value and the second sensing signal value by the processing module, so that a total sensing signal value is generated;
    obtaining the calibration force value corresponding according to a coordinate of the first force touch position by the processing module;
    obtaining a corresponding one of the first calibration signal values and a corresponding one of the second calibration signal values according to the coordinate of the first force touch position by the processing module;
    adding the corresponding first calibration signal value and the corresponding second calibration signal value by the processing module, so that a total calibration signal value is generated; and
    obtaining the first real force value by the processing module according to the total sensing signal value, the total calibration signal value and the first-calibration force value, wherein a ratio of the total sensing signal value to the total calibration signal value is equal to a ratio of the first real force value to the Hiss-calibration force value.

2. The force touch judgement method according to claim 1, wherein the processing module comprises a memory unit, and a look-up table a comprising the plural coordinates, the calibration force value, the first calibration signal values and the second calibration signal values is stored in the memory unit.

3. The force touch judgement method according to claim 2, further comprising steps of:
    the processing module searching the calibration force value from the look-up table according to the coordinate of the first force touch position; and
    the processing module searching the corresponding first calibration signal value and the corresponding second calibration signal value from the look-up table according to the coordinate of the first force touch position.

4. The force touch judgement method according to claim 1, wherein the force touch pad further comprises a vibration module, wherein if the first real force value is higher than a force touch threshold value, the force touch judgement method further comprises a step of issuing a feedback instruction from the processing module to the vibration module, so that the vibration module results in vibration.

5. The force touch judgement method according to claim 1, wherein the force touch pad is installed on a computing device, and an application program is loaded in the computing device, wherein if the first real force value is higher than a force touch threshold value, the force touch judgement method further comprises a step of issuing an operation instruction from the processing module to the application program, so that the application program executes a preset function.

6. The force touch judgement method according to claim 1, wherein the touch member comprises a touch sensing module, wherein if the first force touch operation is performed on the touch member, the force touch judgement method further comprises a step of forming the first force touch position corresponding to the first force touch operation on a two-dimensional plane by the touch sensing module.

7. A force touch judgement method for a force touch pad, the force touch pad comprising a processing module, a touch member, a first force sensor with linear response and a second force response, the first force sensor and the second force sensor being located under the touch member and at different positions, the force touch judgement method comprising steps of:

performing a calibration process on the force touch pad, comprising:

respectively force touch operations with a calibration force value on plural coordinates of the touch member to generate first calibration signal values by the first force sensor and second calibration gr al values by the second force sensor, wherein each of the plural coordinates corresponds to the calibration force value, one of the first calibration signal values and one of the second calibration signal values;

performing a first touch operation corresponding to a first real force value ($F_A$) and a second force touch operation corresponding to a second real force value ($F_B$) on the touch member, so that the touch member generates a first force touch position corresponding to the first force touch operation and a second force touch position corresponding to the second force touch operation;

generating a first sensing signal value ($S_1$) corresponding to the first force touch operation and the second force touch operation by the first force sensor, and generating a second sensing signal value ($S_2$) corresponding first force touch operation and the second force touch operation by the second force sensor;

obtaining the calibration force value ($F_{CA}$) according to a coordinate of the first force touch position and the calibration force value ($F_{CB}$) according to a coordinate of the second force touch position by the processing module;

obtaining a corresponding one of the first calibration signal values ($S_{CA1}$) and a corresponding one of the second calibration signal values ($S_{CA2}$) according to the coordinate of the first force touch position by the processing module, and obtaining a corresponding one of the first calibration signal values ($S_{CB1}$) and a corresponding one of the second calibration signal values ($S_{CB2}$) according to the coordinate of the second force touch position by the processing module; and obtaining the first real force value ($F_A$) and the second real force value ($F_B$) by following equation:

$$\begin{bmatrix} S_1 \\ S_2 \end{bmatrix} = \begin{bmatrix} S_{CA1} & S_{CB1} \\ S_{CA2} & S_{CB2} \end{bmatrix} \cdot \begin{bmatrix} \frac{F_A}{F_{CA}} \\ \frac{F_B}{F_{CB}} \end{bmatrix}.$$

8. The force touch judgement method according to claim 7, wherein the processing module comprises a memory unit, and a look-up table comprising the plural coordinates, the calibration force value the first calibration signal values and the second calibration signal values is stored in the memory unit, wherein the force touch judgement method further comprises steps of:

the processing module searching the calibration force value ($F_{CA}$) according to the coordinate of the first force touch position and the calibration force value ($F_{CB}$) according to the coordinate of the second force touch position from the look-up table; and the processing module searching the corresponding first calibration signal value ($S_{CA1}$) and the corresponding second calibration signal value ($S_{CA2}$) according to the coordinate of the first force touch position, and searching the corresponding third first calibration signal value ($S_{CB1}$) and the corresponding second calibration signal value ($S_{CB2}$) according to the coordinate of the second force touch position from the look-up table.

9. The force touch judgement method according to claim 7, wherein if both of the first real force value and the second real force value are higher than a force touch threshold value and the second real force value is lower than the first real force value, the processing module ignores the second real force value.

10. The force touch judgement method according to claim 7, wherein the first force touch position corresponding to the first force touch operation has a first sensing range, and the second force touch position corresponding to the second force touch operation has a second sensing range, wherein if the second sensing range is larger than the first sensing range, the processing module ignores the second real force value.

* * * * *